United States Patent Office 3,259,570
Patented July 5, 1966

3,259,570
DEWATERING AQUEOUS SUSPENSIONS
OF ORGANIC SOLIDS
Charles P. Priesing and Stanley Mogelnicki, Midland, Mich., assignors to The Dow Chemical Company, Midland, Mich., a corporation of Delaware
Filed Mar. 4, 1963, Ser. No. 262,405
9 Claims. (Cl. 210—53)

The present invention concerns a novel process for dewatering aqueous suspensions which comprise in the suspended phase, agglomerated, hydrophilic organic solids. More particularly, the invention is concerned with a process for conditioning sewage sludges to effect rapid and efficient dewatering thereof.

Heretofore, aqueous suspensions of agglomerated organic solids such as sewage sludges have been dewatered by any one of, or combination of, several techniques involving compaction, filtration or flotation operations. In compaction operations, dispersed solids in a liquid system are concentrated or thickened with the aid of gravity, centrifugal or direct physical forces. Filtration is perhaps the most frequently employed technique for resolving a liquid suspension of solids into liquid and solid phases. Fundamentally, filtration is accomplished by presenting the liquid suspension to a septum or filter media permeable to the liquid, but impermeable to the solids, under forces such that the liquid phase is caused to flow through the septum or filter media. Sometimes the forces which cause the liquid to flow are the result of direct pressurization on the upstream side of the filter and in other instances reduced pressures on the downstream side of the filter. In some filtration operations the force utilized is simply gravity acting upon the solid suspension to be filtered. The last of the aforementioned dewatering operations, i.e., flotation, involves physically decreasing the density of the suspended phase such that it is caused to separate from the liquid phase and rise toward the surface of the liquid.

Regardless of the dewatering technique used, aqueous suspensions of predominantly organic solids, such as sewage sludges, are most difficult to dewater due to the extremely hydrophilic and amorphous nature of the solids. Such suspensions are usually essentially non-free settling at concentrations above about 0.1 percent by weight. That is, little or no densification occurs under gravity without further mechanical or chemical conditioning. Illustrative of such essentially non-free settling suspensions of organic solids are the raw, digested and activated municipal sewage sludges. In order to dewater such sludges by vacuum filtration, it is frequently necessary to employ as much as 50 to 200 pounds per ton of dispersed organic solids of inorganic additaments such as lime and ferric chloride. While cationic organic polyelectrolytes, especially water-soluble, nitrogenous polymers, can be employed to effectively condition the sewage sludges for filtration, the amounts of the cationic polymers required for this purpose render the treatment economically prohibitive for many operations. A reference which describes a process for dewatering sewage sludges with a number of cationic organic polymers is United States Patent 3,014,896.

It would be desirable, and it is an object of the present invention, to provide a novel process to promote more efficient and rapid dewatering of essentially non-free settling, aqueous suspensions of predominantly hydrophilic organic solids. In particular, it is an object to provide a novel process relating to the dewatering of sewage sludges by any one of the dewatering techniques involving compaction, filtration or flotation principles. A still further object is to provide a process for dewatering sewage sludges requiring small amounts of chemical reagents. Other objects and benefits will become apparent hereinafter as the invention is more fully described.

In the drawing, solid line curves graphically depict results achieved in filtering a digested municipal sewage sludge in accordance with several representative embodiments of the invention. A broken line curve depicts a control operation which forms a basis for comparing the invention with the prior art.

In particular, the present invention provides a novel process for dewatering liquid aqueous suspensions of agglomerated organic solids, which solids are amorphous and hydrophilic in nature and at a concentration whereby the solids are essentially non-free settling. While it is known that such suspensions can be conditioned for filtration operations by the addition thereto of water-soluble, cationic organic polymers (cationic polyelectrolytes), it has now been discovered that the addition to the suspension, with mixing, of a dilute aqueous solution of a high molecular weight, water-soluble, anionic polymer (anionic polyelectrolyte) prior to the addition of the cationic polyelectrolyte is most advantageous. Among the advantages obtained are more rapid dewatering of the suspension with greatly enhanced recovery of the organic solids from the liquid phase. The agitation employed to accomplish the required mixing is sufficient to uniformly distribute the polymer throughout the suspension but neither so hard nor so long as to significantly break down the existing agglomerates. Anionic polyelectrolytes contemplated herein are water-soluble polymers having polyalkane backbones characterized as containing a plurality of at least one substituent ionic functional group selected from the group consisting of carboxylic, sulfonic, alkali metal carboxylate and alkali metal sulfonate groups.

The above conditioning process for dewatering operations is especially effective if the total dilution of the suspension with water is maintained within the range from about $0.01(S)$ to $1.0(S)$ volumes of water per volume of sludge. In the foregoing S equals the solids, on a dry basis, in parts per 100 parts of the liquid suspension. Suspensions contemplated herein are liquid in character and contain at least about 0.1 part solids on a dry basis per 100 parts of the suspension. Often they contain from 1 to 15 parts of such solids per 100 parts of liquid suspension. Higher amounts up to 25 parts per 100 parts are possible but rare in sewage sludges prior to dewatering.

The terminology "dry basis" in specifying solids contents herein has reference to the percent by weight solids determined by evaporating the water from a predetermined aliquot of the suspension at a moderate temperature of about 110° C. While this determination will include soluble as well as insoluble constituents of the suspension, the soluble fraction is small as compared to the insoluble solids, i.e., suspended, fraction. Thus, treatments specified herein on the basis of suspension solids computed on a "dry basis" are essentially controlled by the insoluble portion of the suspension.

Typical suspensions that can be conditioned and dewatered according to the invention include the various types of liquid, i.e., fluid, municipal waste sludges, e.g., raw, activated (obtained by aerobic bioligical oxidation of raw sewage) and digested (obtained by anaerobic biological oxidation of raw sewage) sewage sludges. The process is also well adapted for rapid dewatering of most liquid sewage sludges of agglomerated organic solids encountered in the waste disposal systems for cannery, textile, paper, meat packing, vegetable canning, fruit canning, petroleum refining, dry and chemical industrial wastes, inclusive of raw, activated and digested sludge forms thereof. Generally the conditioning process of the invention is applicable to non-free settling sludges of hydrophilic organic solids, which sludges are characterized by a net negative charge as determined by electrophoretic mobility measurements. In other terms, the sludges affected are those having a negative zeta potential.

In addition to the advantages of achieving rapid dewatering and better solids removal, sludges conditioned in accordance with the invention are characterized by exceptional stability against mechanical agitation. A still further advantage is the substantial reduction in the amount of a water-soluble, cationic, nitrogenous polymer required to effect efficient dewatering.

The latter advantage is most surprising in view of the fact that the high molecular weight, anionic polyelectrolytes have little or no beneficial effect on the dewatering characteristics of sewage sludges when employed as the sole treating agent.

The anionic polyelectrolytes employed in accordance with the present invention are high molecular weight, synthetic, organic polymers characterized as consisting of linear carbon to carbon chains (polyalkanes) obtained by vinyl polymerizing one or more vinylidene monomers bearing a carboxylic or sulfonic acid group, or an alkali metal salt of such acidic groups. Such polymers are homopolymers of these anionic functional monomers or interpolymers thereof with other suitable vinylidene monomers capable of undergoing vinyl polymerization. In such interpolymers, it is essential that sufficient carboxylic or sulfonic acid bearing monomers, or salts thereof, or such monomers with other monomers containing water-solubilizing groups be present in the finished polymer to render it water-soluble. Usually, a minimum of at least about 50 mole percent of the combined monomer moieties should bear water-solubilizing groups in order to insure that the resulting polymer is properly water-soluble. Also, it is essential that a minimum of about 4 mole percent of the monomer moieties combined in the finished polymer should bear an anionic substituent of the specified class of sulfonic, sulfonate, carboxylic and carboxylic groups.

By "high molecular weight," as applied to the above anionic polymeric agents, is meant an average molecular weight of at least about 0.5 million as determined by light scattering measurements. The term "water-soluble" means dispersible in water to provide a visually continuous dispersion infinitely dilutable with water.

A preferred species of anionic polyelectrolyte for use in accordance with the present invention is a high molecular weight homopolymer of an alkali metal salt of vinyl benzene sulfonic acid. Similar polymers correspond to water-soluble copolymers prepared by the vinyl polymerization of a major proportion of vinyl benzene sulfonic acid, or an alkali metal salt thereof, and a minor proportion of a monomer copolymerizable therewith such as acrylamide, methacrylamide, acrylonitrile, methacrylonitrile, styrene, vinyl toluene, methyl acrylate and the like. For good results, such polymeric agents should have a molecular weight of at least 1,000,000 and more preferably of at least 4,000,000. Further improved results are obtained with even higher molecular weights, provided the polymer remains effectively water-soluble.

Another variety of anionic polyelectroltye suitable for use in accordance with the invention is constituted by high molecular weight, water-soluble copolymers of styrene and maleic anhydride. Such copolymers are generally employed in the form of the alkali metal salts thereof, preferably the sodium salt, although the acid form obtained by acid hydrolysis of the anhydride rings may also be employed. In order to obtain the advantages of the invention, it is necessary that the styrene maleic anhydride copolymers have molecular weights of at least 1,000,000 and preferably of at least 4,000,000.

Anionic acrylic polymers that can be employed in the present invention are water-soluble, substantially linear polymers of high molecular weight obtained by the vinyl polymerization of acrylic acid, methacrylic acid, sulfoethyl acrylate, carboxyethyl acrylate or water-soluble salts of the foregoing acidic monomers or by copolymerization of the acidic monomers, or alkali metal salts thereof, with suitable amounts up to about 96 mole percent of other vinyl monomers such as acrylamide and methacrylamide.

Other suitable anionic acrylic polymers are obtained as the vinyl polymerization products of acrylamide or methacrylamide, or as the copolymerization products of such monomers with other suitable monomers including, for example, acrylonitrile, methacrylonitrile, lower alkyl esters of the acrylic acids, vinyl alkyl ethers and the like monoethylenically unsaturated compounds. During the polymerization reaction or thereafter with appropriate treatments, carboxamine moieties of the polymer are hydrolyzed to provide a desired number of anionic carboxylic or carboxylate groups. Usually, such copolymers are prepared in reaction mixtures containing at least about 85 mole percent of the acrylamide or methacrylamide and not more than about 15 mole percent of the other monomers.

Anionic polymeric agents can also be produced by hydrolysis of preformed non-ionic polymers. For example, vinyl polymerized forms of acrylonitrile or methacrylonitrile can be hydrolyzed by reacting them with an aqueous metal hydroxide solution to convert the nitrile groups to the corresponding alkali metal carboxylate groups. Similarly, polymers or copolymers of alkyl esters of unsaturated acids can be saponified with an alkali metal hydroxide to convert ester groups to alkali metal carboxylate groups.

Cationic polyelectrolytes used in the invention are water-soluble, synthetic, organic polymers characterized as containing in or attached along the polymeric chain a plurality of amino, imino or quaternary ammonium groups. These nitrogenous polymers are generally recognized as having a beneficial effect on the filterability of the aforedescribed sewage sludges when properly applied thereto. Unlike the anionic polyelectrolyte employed herein, the cationic polyelectrolytes have no critical molecular limitations. It is preferred, however, to operate with higher molecular weight polymers.

Representative of such cationic, nitrogenous polymers are homopolymers and water-soluble copolymers of one or more monomers such as N-vinylpyridine and substituted derivatives thereof; mono-, di-, or trialkylammonium salts, e.g., vinyl benzyl trimethylammonium chloride; allylamine and N-alkyl substituted derivatives thereof, aminoethyl acrylate hydrochloride or aminoethyl methacrylate hydrochloride and, in general, any ammonium or substituted ammonium alkyl acrylate or methacrylate such as N-methyl- of N,N-dimethylaminoalkyl acrylate or methacrylate, wherein the the alkyl groups contain 2 or 3 carbons, or the like. Other suitable cationic, nitrogenous polymers are obtained when a nitrogen containing monomer is copolymerized with one or more other monoethylenically unsaturated monomers capable of undergoing vinyl polymerization, provided that the resulting copolymer is water-soluble and essentially free of anionic substituents. In such copolymers, at least about 5 mole percent, preferably at least 10 mole percent, of the monomers combined in the copolymer should be cationic, nitrogen containing monomers. Suitable monoethylenically unsaturated monomers to be copolymerized with these cationic monomers include acrylamide, methacrylamide, acrylonitrile, the lower alkyl esters of acrylic and methacrylic acids, vinyl methyl ether, N-vinyl oxazolidinone, N-vinyl pyrrolidinone and the like. It should be noted that for the purposes of preparing cationic polymers for the present invention, the amide groups, such as in acrylamide, and nitrile groups, such as in acrylonitrile, are not sufficiently cationic. However, monomers containing these groups can be employed in conjunction with other nitrogenous, cationic monomers to provide effective cationic polymers.

When the comonomers employed in the preparation of cationic organic polymers embody water-solubilizing groups, such comonomers may be present in amounts up to 95 mole percent of the combined moieties in the finished cationic, nitrogenous polymer. When hydrophobic comonomers such as the alkyl esters of acrylic and methacrylic acids or styrene are interpolymerized with the cationic monomers, it is generally required, in order to produce a water-soluble polymer, that at least about 60 mole percent of the combined monomer moieties be hydrophilic, i.e., bearing water-solubilizing groups.

A preferred class of cationic polymers is represented by water-soluble polyethylenimines of high molecular weight, substituted polyethylenimines and the mineral acid and quaternary ammonium salts thereof. Some polyethylenimines suitable for use in the invention can be represented by the formula:

wherein R is hydrogen or methyl and $n$ has a value of at least 400, preferably of at least 2,000. Desirable polyethylenimines can be characterized by the viscosity of aqueous solutions thereof. Thus, water-soluble polyethylenimines having viscosities of at least about 0.8 centistoke and preferably at least 2 centistokes for an aqueous, one percent by weight solution thereof are preferred cationic polymers. Also, the various salts of these polymers such as the interreaction products thereof with hydrochloric, sulfuric, phosphoric, carbonic and acetic acids are efficient cationic polymers.

The vinyl benzyl quaternary ammonium compounds preferred for use in the present invention are the homopolymers of vinyl benzyl quaternary ammonium salts or copolymers of a vinyl benzyl quaternary ammonium compound with arcrylamide, methacrylamide or water-soluble N-alkyl substituted derivatives thereof. Said copolymers may contain in polymerized form a very small amount up to about 95 mole percent of the acrylic comonomer. These polymers and copolymers contain a plurality of groups having the following structure:

wherein each R represents a lower alkyl radical containing from 1 to 4 carbon atoms, inclusive, and X represents an anion such as hydroxyl, chloride, bromide, iodide, hydrosulfate, dihydrophosphate or the like. The preferred vinyl benzyl quaternary ammonium polymers and copolymers are those having a viscosity of at least 1.2 centipoises for a 0.5 percent by weight solution thereof in an aqueous 4 percent by weight sodium chloride solution at 25° C.

Certain of the foregoing cationic or anionic polymers as well as other related polymers operable in the invention can be prepared by modification of preformed polymers. Thus, for example, a linear high polymer of a vinylaryl hydrocarbon, such as styrene, vinyl toluene, α-methylstyrene, vinylxylene or the like can be sulfonated under controlled conditions to produce a water-soluble, substantially linear polymer sulfonate useful as an anionic polyelectrolyte in the invention. Alternatively, such a polyvinylaryl hydrocarbon can be chloromethylated, for example, by reaction with formaldehyde and hydrogen chloride, and the resulting chloromethylated polymer can be reacted with a tertiary amine to produce a cationic polymer containing a plurality of polymerized vinyl benzyl quaternary ammonium moieties. Similarly, a homopolymer of a vinyl benzyl halide can be reacted with a tertiary alkyl amine to produce the corresponding cationic quaternary ammonium substituted polymer.

To carry out the present novel conditioning process in connection with compaction, filtration or flotation processes, an aqueous suspension of agglomerated, essentially non-free settling organic solids, e.g., a municipal raw sewage sludge, is treated with a small but effective amount of a water-soluble, high molecular weight anionic polyelectrolyte as hereinbefore described. The treatment is accomplished by adding the polymer in the form of a dilute aqueous solution to the sludge with mild agitation of the sludge. The solution added is generally made up to provide a predetermined desired polymer dosage at a given dilution level. Thus, the polymer solution may contain anywhere from as little as about 0.001 percent up to as much as 5 percent by weight polymer solids. While neither of these limits is critical, the lower limit represents a practical dilution limit and the upper limit represents an approximate physical limit for the convenient and practical handling of the high molecular weight anionic polymer solutions which, at or before this concentration level, become too viscous for convenient manipulation. The total dosage of the anionic polymer used will vary somewhat according to the chemical nature and molecular weight of the polymer, but in general the amount employed is small in relation to the amount of cationic organic polymer used. For most operations the amount of the high molecular weight anionic polymer used will vary within the range from about 0.01 to 10 pounds of the polymer per ton of solids on a dry basis. For compaction operations it is preferred to employ at least about 0.5 and up to as much as 10 pounds of the anionic polymer per ton of solids on a dry basis. Filtration operations are unique in that comparably small amounts of the anionic polymer produce significant results. Illustratively, at least about 0.1 and no more than 2.5 pounds of the polymer are employed per ton of solids.

Agitation of the aqueous dispersion during the addition of the anionic polyelectrolyte is accomplished by any convenient agitating means. Examples of suitable means include large slowly rotating paddles, effervescing gases and moderately turbulent flow in conduits which may contain baffles to increase agitation at low flow rates. In any event the agitating means used are designed to provide homogeneous incorporation of the high molecular weight anionic polymer into the aqueous suspension of the agglomerated organic solids. While it is preferred to avoid significant destruction of the existing agglomerates, obtaining an intimate and uniform admixture of the polymer with the suspension is more important than avoiding some destruction of the existing agglomerates. Thus, the extent of or control of agitation in this step is less important than in the following step whereby the cationic organic polymer is added to the suspension.

The cationic organic polyelectrolytes, as specified for employment herein, are likewise added to the aqueous suspension in the form of a dilute solution which may contain as little as 0.001 percent up to as much as 30 or 40 percent polymer solids depending upon the concentration level at which the polymer solution becomes inefficient for application purposes due to excessive viscosity. This polymer like the anionic polyelectrolyte is added to the aqueous dispersion with mild agitation which may be produced by any one of the above-described means, or similar means, whereby the cationic polymer is intimately distributed throughout the suspended organic solids. These solids should remain in, or result in, an essentially agglomerated condition during the mixing with the addition of the cationic polymer. While the ultimate dewatering results will vary according to the exact chemical nature of the cationic polymer and its molecular weight, good to excellent results are usually achieved with the employment of from about 0.5 to about 100 pounds of the organic cationic polymer per ton of solids on a dry basis. Frequently the amount employed is within the range from about 1 to 10 pounds of the cationic polymer per ton of solids.

While it is implicit in the foregoing that water of dilution will be incorporated into the aqueous dispersion of organic solids along with the treating polymers, care should be exercised in controlling this parameter so as to maintain the number of volumes of water added per volume of sludge treated within the specified range, i.e., 0.01(S) to 1.0(S). This dilution water can be added as the solution medium for the polymers or in one or more other separate operational steps. The optimum total dilution in any one instance will be in part dependent upon the type of sludge being treated and secondly upon the concentration of organic solids in that sludge.

A further process parameter, which should be controlled for best results in the practice of the invention is the ratio of the weight of anionic polymer to the weight of cationic organic polymer employed. An overall range for this ratio is from about 1:1 to 1:20. In conditioning sewage sludges for compaction operations, this ratio will lie within the range from about 1:1 to 1:5. In filtration operations the ratio is usually within the range from 1:3 to 1:20. As a general rule the amount of anionic polymer required can be reduced, and thus the ratio of anionic polymer to cationic polymer decreased through the employment of milder agitation during the addition of the polymers. Illustratively, severe agitation whereby the initial agglomerates of organic solids are significantly broken down, may result in the employment of a 1:1 ratio of anionic polymer to cationic polymer. Milder agitation may decrease this ratio to about 1:15.

In one particular embodiment of this invention, the point of addition to the suspension for the anionic polymer is remote, rather than proximate, to the point of addition for the cationic polymer. For instance, the anionic polymer is sometimes conveniently incorporated into the suspension during a prior sedimentation or clarification step whereby a waste stream is clarified and the solids underflow forms the non-free settling sludges which are of concern herein. During the clarification or sedimentation operation the anionic polymer is added to the waste stream in an amount within the range from 0.1 to 2.5 pounds per ton of solids on a dry basis. Intimate mixing of the polymer with the solids, which form the sludge, readily occurs during the settling of the solids. Subsequently, at a point more proximate to the dewatering device, the cationic organic polymer is added to the anionic polymer treated sludge with proper agitation to provide a sludge conditioned for efficient dewatering.

It will be recognized that other procedural embodiments for carrying out the invention are possible. Thus, the dual polymer treatment of the invention can be utilized separately or conjunctively with the employment of other chemical treating systems which may utilize alum, ferric chloride or lime. Further, dewatering processes described herein can be augmented through the employment of biological and mechanical sludge treating techniques.

While the foregoing description of the conditioning process of the invention is generally applicable to all types of dewatering operations for separating suspensions of essentially non-free settling, organic solids such as compaction, filtration and floatation operations, each of these is a distinct process in itself. Thus, completion of the dewatering process after accomplishing the dual polymer treatment will involve parameters unique to the particular separatory technique utilized.

Illustratively, in the first of the aforementioned dewatering operations, i.e., dewatering by compaction or thickening, the dewatering technique utilizes prolonged detention or residence times for the polymer treated suspension in an essentially quiescent zone. For instance, sludge thickeners, wherein compaction according to the invention is most often carried out, are generally designed with cross-sectional areas, and for hydraulic underflow rates, such that the solids detention time within the thickening unit is increased in comparison to the liquid detention time. This is in direct contrast to primary clarifiers, which operate on the principle of sedimentation by receiving primary waste and producing an underflow suspension of agglomerated solids and an overflow of a partially clarified liquid. In such clarifiers, the solids detention times are usually short in comparison to the hydraulic detention times.

The residence time for effective thickening according to the invention will vary depending upon the extent of compaction desired and the amounts of polymers employed to condition the suspension. Generally, detention times of at least 30 minutes are required. Often, however, detention times will extend to as much as 4 to 12 hours. Suspensions such as sewage sludges which are not treated in accordance with the invention will often require detention times from 12 to 24 hours. It is manifest from the comparatively more rapid thickening rates achieved in accordance with the invention that the possibility of septicity in the thickened solids is significantly reduced since the latter condition is essentially a function of time. By avoiding septicity more complete separation of the solids from the liquid phase and a denser thickened solids phase are possible.

One of the process variables involved in compaction operations is the requirement that the suspension be diluted with water. For best results, the solids content should be within the range from about 0.1 to about 5 percent by weight of the suspension. It is desirable to add the required dilution water as the dispersing medium for the treating polymers. Upon incorporation of the treating polymers and necessary dilution water to adjust the solids content to a desired level, the conditioned suspension is passed into a quiescent, detention zone, e.g., sludge thickening unit.

Initially the polymer conditioned agglomerated organic solids undergo subsidence in the thickening unit at a constant rate. Subsequently, the conditioned solids undergo thickening at a decreased rate during which period the solid agglomerates are being deformed and compressed. Compression of the solids during this latter stage is aided by the employment of slowly rotating rakes and other mildly agitating means. Upon completion of the deformation of the agglomerates, a thickened and substantially dewatered sludge is obtained.

It is interesting to note that once compacted, the polymer treated organic solids obtained in this manner are not readily dewatered by filtration. Thus, if the compacted suspension is to be filtered, it is necessary to again treat the compacted organic solids in accordance with the invention.

To accomplish filtration of an aqueous suspension of agglomerated organic solids, polymer conditioning is carried out as described above but the conditioned suspension should be filtered as soon as is convenient after completion of the treatment with polymers. Any detention of the suspension in a quiescent zone should be kept at a minimum. For best results it is desirable to filter conditioned suspensions having solids concentrations of at least about 1 but not more than about 15 percent by weight of the suspension. Manifestly, since filter yield is a function of solids loading per filter unit area per unit of time, it is desirable to employ high solids concentrations in the filter feed. However, for best results some dilution of the suspension to be filtered is desirable. The degree of dilution to be used is primarily a function of the solids concentration according to the aforedescribed formula for dilution. In general, the solids concentrations employed in filtering suspensions of organic solids are higher than solids concentrations in suspensions which are to be subjected to compaction. For instance, a digested municipal sewage sludge which ordinarily contains about 11 percent by weight solids on a dry basis is usually filtered better at an 8 percent by weight solids concentration than at either 4 or 12 percent solids. In a compaction operation, however, the same sludge should be diluted to about 0.5 percent by weight solids.

It should be recognized that the organic solid phases to be filtered in accordance with the invention described herein may, due to their extreme hydrophilicity contain a substantial amount of imbibed water. Complete water removal is nearly impossible, but filter cakes obtained by filtering suspensions treated in accordance with the invention will ordinarily contain substantially smaller amounts of water than filter cakes obtained by methods of the prior art.

In flotation dewatering operations, the suspension of organic solids treated with the dual polymer system is subjected to compressed air. Typical pressures used are within the range from about 20 to about 60 pounds per square inch gauge. The compressed air is maintained over the suspension for a period sufficient to permit saturation of the liquid by air. Upon release of the air pressure above the liquid suspension, the dissolved air coming out of solution causes the solids to rise toward the surface of the liquid due to buoyant forces. Flotation operations are similar to compaction operations by gravity in that the former is likewise best carried out on suspension having from about 0.1 to about 5 percent by weight solids on a dry basis.

The following examples illustrate the general dual polymer conditioning process of the invention and specific instances of its adaptation to filtration and compaction dewatering processes for various suspensions of organic solids.

EXAMPLE 1

The following operations were designed to demonstrate filtering efficiencies realized by the timely addition of small amounts of an anionic polyelectrolyte to a digested municipal sewage sludge containing about 10 percent by weight organic solids, which sludge is conditioned for filtration by incorporating a cationic organic polymer therein.

The test procedure involved measuring 100 milliliters of the sludge into a 250 milliliter beaker. To this sludge was added 25 milliliters of dilution water having dissolved therein a predetermined dosage of a sodium polystyrene sulfonate characterized by a weight average molecular weight of about 5 million. Predetermined dosages of this polymer were measured with a hypodermic syringe from a stock solution of the polymer containing 0.5 percent by weight polymer solids. The dosages employed were computed on the basis of pounds of polymer per ton of suspension solids on a dry basis.

After addition of the dilute aqueous sodium polystyrene sulfonate to the sludge, mixing was accomplished by pouring the treated sludge back and forth between 250 milliliter beakers.

A predetermined dosage of a cationic organic polymer, i.e., a water-soluble polyvinylbenzyltrimethylammonium chloride, was then incorporated into the sludge with an additional 25 milliliters of dilution water. Mixing of the cationic polymer into the sludge was achieved by pouring the sludge from beaker to beaker four times as described above.

Figure 1:
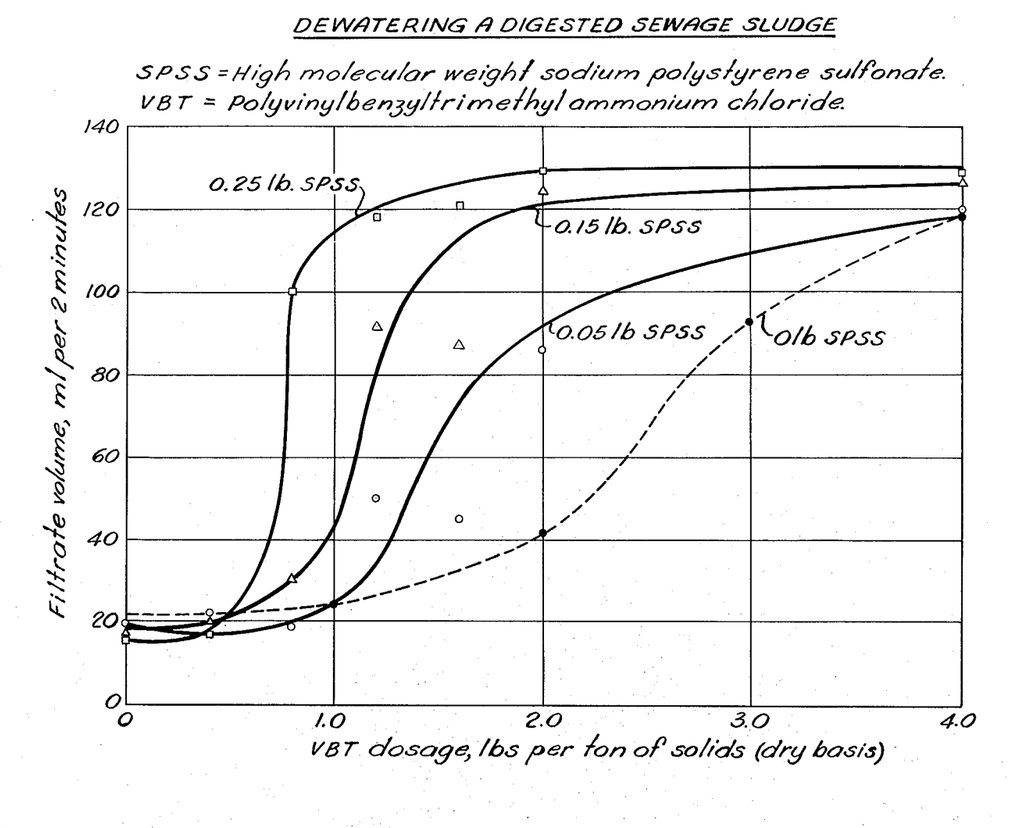

The treated sludge was then poured into a 12.5 centimeter Buchner funnel containing two layers of No. 1 Whatman filter paper. The filter was seated in a vacuum flask wherein a vacuum of 15 to 29 inches of mercury was maintained throughout the dewatering operation. Dewatering of the treated sludge was carried out for two minutes, as determined from the time of initial vacuum application, and the volume of filtrate collected during this period was measured. These results are graphically depicted in the accompanying drawing wherein the volume of filtrate collected during the specified two minute dewatering time is plotted as a function of the cationic polymer concentration, with each curve having as a constant parameter the dosage of the high molecular weight, anionic polyelectrolyte used. As is evidenced by these curves, very small dosages of the anionic polymer have a very pronounced influence upon the dewaterability of the sludge. Such anionic polymers employed as the sole treating agent, however, have little or no effect and may actually reduce the dewaterability of the sludge.

EXAMPLE 2

Another series of filtration experiments were conducted to demonstrate the effect of dilution, as well as the employment of the dual polymer treatment in accordance with the invention to dewater sewage sludge. The experiments involved treating a series of 113 milliliter aliquots of a digested municipal sewage sludge containing 16 grams of solids on a dry basis. Five dilution levels were used with a total of 2 aliquots at each dilution level. One of these aliquots was treated with a water-soluble polyethylenimine at a dosage of 1 pound of polymer per ton of solids on a dry basis. A second aliquot, at each dilution level, was given an additional treatment prior to the incorporation of the polyethylenimine with a dosage of 1 pound per ton of solids, on a dry basis, of a high molecular weight sodium polystyrene sulfonate. Each of these polymers was separately mixed with the sludge as in Example 1.

The polymer treated aliquots were then dewatered in a Buchner funnel seated in a vacuum flask to which a vacuum varying from 15 to 29 inches of mercury was applied. Volumes of filtrate accumulated at several time intervals were observed and recorded.

The results of these dilution experiments are reported in the following table. The volume of filtrate is reported in terms of the net effective removal of water from the sludge suspension. That is, the positive values reported show net removal of water. Negative values indicate the volume of water added by dilution which remains in the system. Runs 1, 3, 5 and 7 are for sludge aliquots treated only with the polyethylenimine. Runs 2, 4, 6 and 8 are for sludge aliquots treated with the anionic polymer followed by the cationic polymer.

*Table 1*

| Run | Sludge Aliquot (ml.) | Dilution Water (ml.) | Percent Solids in Diluted Sludge | Net Water Filtered at Specified Time Intervals | | | | | | | | |
|---|---|---|---|---|---|---|---|---|---|---|---|---|
| | | | | 0 Sec. | 20 Sec. | 40 Sec. | 60 Sec. | 120 Sec. | 180 Sec. | 240 Sec. | 300 Sec. | 360 Sec. |
| 1 | 113 | 37 | 10 | −37 | +1 | +17 | +27 | +43 | +53 | +59 | | +67 |
| 2 | 113 | 37 | 10 | −37 | +23 | +41 | +48 | +59 | +65 | +69 | | +71 |
| 3 | 113 | 77 | 8 | −77 | −19 | +5 | +19 | +49 | +59 | +65 | +65 | +65 |
| 4 | 113 | 77 | 8 | −77 | +13 | +41 | +53 | +63 | +67 | +67 | +67 | +67 |
| 5 | 113 | 143 | 6 | −143 | −69 | −33 | −9 | +37 | +57 | +67 | +69 | +69 |
| 6 | 113 | 143 | 6 | −143 | −33 | +21 | +43 | +61 | +67 | +68 | | +69 |
| 7 | 113 | 277 | 4 | −277 | −197 | −147 | −122 | −52 | +3 | +43 | | +63 |
| 8 | 113 | 277 | 4 | −277 | −187 | −122 | −77 | +13 | +58 | +68 | | +73 |

EXAMPLE 3

In further operations to test other combinations of polymer treatments, sewage sludges containing different amounts of suspended solids were divided into 100 milliliter aliquots contained in suitable beakers. A separate portion of each sludge was subjected to analysis for its dry solids content.

In control establishing experiments, 100 ml. aliquots of the sewage sludge were diluted to specified volumes and filtered. Certain diluted sludge volumes were also treated individually with either an anionic polymer or a cationic organic polymer. The diluted and polymer treated sludge aliquots were then poured gently four times from one beaker to another and thereafter into a 12.5 centimeter Buchner funnel wherein the sludges were dewatered for two minutes according to the procedure of Example 1. At the conclusion of the dewatering period, the vacuum was broken, the filter cake, if any, observed for appearance and the volume of filtrate in the filter flask was measured.

For treatment in accordance with the invention, the dilution water added to the 100 ml. aliquot of sludge in the foregoing procedure was divided into two equal parts. To one part thereof, an anionic organic polymer under test was added in amount sufficient to provide a predetermined polymer dosage. The resulting solution was added to a sludge aliquot and mixed therewith by pouring the sludge back and forth from one beaker to another for a total of four times. To the remaining portion of the dilution water was added the cationic organic polymer. This solution was also poured into the sludge with mixing by pouring the treated sludge from beaker to beaker as before. Note that in Runs 12 and 14 listed below, the foregoing order of addition, i.e., anionic polymer first followed by the cationic polymer, was reversed.

The resulting treated sludge was then filtered according to the standard procedure set forth above. The specific operating conditions and volume of filtrate obtained from such filtration operations for various sewage sludges from the sewage treatment plant of a small Midwestern city are set forth in the following table. Also included in the table for the purpose of comparison are runs made utilizing conventional flocculants such as ferric chloride and lime separately and conjunctively with the dual polymeric system of the invention.

Table 2.—Filtration of sewage sludges

| Run | Dose of— Anionic Polymer | Lbs./Ton Dry Solids | Dose of— Cationic Polymer | Lbs./Ton Dry Solids | Sludge Type | Dry Solids (gms.) | Diluted Sludge (ml.) | Volume of Filtrate in 2 Min. (ml.) |
|---|---|---|---|---|---|---|---|---|
| 1 (control) | | | | | Anaerobically digested | 10 | 150 | 20 |
| 2 (control) | SPSS(6M) [2] | .5 | | | do | 10 | 150 | 24 |
| 3 (control) | | | VBT [1] | .5 | do | 10 | 150 | 55 |
| 4 (control) | | | VBT [1] | 2.0 | do | 10 | 150 | 130 |
| 5 | SPSS(6M) [2] | .05 | VBT | 1.5 | do | 10 | 150 | 130 |
| 6 | SPSS(6M) [2] | .1 | VBT | 1.1 | do | 10 | 150 | 130 |
| 7 | SPSS(6M) [2] | .2 | VBT | .8 | do | 10 | 150 | 130 |
| 8 | SPSS(6M) [2] | .3 | VBT | .5 | do | 10 | 150 | 130 |
| 9 | SPSS(4M) [2] | .3 | VBT | .625 | do | 10 | 150 | 130 |
| 10 (control) | | | DMAEM [3] | 2.0 | do | 10 | 150 | 110 |
| 11 | SPSS(6M) | .1 | DMAEM [3] | 1.0 | do | 10 | 150 | 128 |
| 12 | SPSS(6M) | 0.25 | DMAEM (added first) | 2.0 | do | 10 | 140 | 118 |
| 13 | SPSS(6M) | 0.25 | DMAEM | 2.0 | do | 10 | 140 | 124 |
| 14 | SPSS(6M) | 0.5 | VBT-AAm [9] (added first) | 4.0 | do | 5 | 160 | 123 |
| 15 | SPSS(6M) | 0.5 | VBT-AAm | 4.0 | do | 5 | 160 | 130 |
| 16 | SPSS(6M) | .25 | {DMAEM / CaO} | {1.0 / 100} | do | 10 | 150 | 114 |
| 17 | SPSS(6M) | .25 | {DMAEM / FeCl₃} | {1.0 / 50} | do | 10 | 150 | 115 |
| 18 (control) | | | PEI(a) [4] | 1.0 | do | 10 | 150 | 121 |
| 19 | SPSS(6M) | .25 | PEI(a) [4] | .5 | do | 10 | 150 | 124 |
| 20 (control) | PAAm [5] | 0.25 | | | do | 10 | 150 | 40 |
| 21 | PAAm [5] | .25 | PEI(a) | .5 | do | 10 | 150 | 122 |
| 22 (control) | | | | | Raw sludge | 10 | 180 | 35 |
| 23 (control) | | | DMAEM | 2.0 | do | 10 | 180 | 138 |
| 24 (control) | PAAm(30) [6] | 0.25 | | | do | 10 | 180 | 32 |
| 25 | PAAm(30) [6] | .25 | DMAEM | 1.0 | do | 10 | 180 | 144 |
| 26 | SPSS(6M) | .25 | DMAEM | 1.0 | do | 10 | 180 | 158 |
| 27 (control) | SMA [7] | 0.25 | | | do | 10 | 180 | 30 |
| 28 | SMA [7] | .25 | DMAEM | 1.0 | do | 10 | 180 | 156 |
| 29 | SSM [8] | .25 | DMAEM | 1.0 | do | 10 | 180 | 158 |
| 30 (control) | | | VBT | 3.0 | do | 10 | 180 | 155 |
| 31 | PAAm(30) | .25 | VBT | 2.0 | do | 10 | 180 | 156 |
| 32 | SPSS(6M) | .25 | VBT | 2.0 | do | 10 | 180 | 158 |
| 33 (control) | | | | | Paper mill raw waste sludge | 4 | 220 | 45 |
| 34 (control) | SPSS(6M) | 1.5 | | | do | 4 | 220 | 45 |
| 35 (control) | | | PEI(a) | 5 | do | 4 | 220 | 150 |
| 36 | SPSS(6M) | 1.5 | PEI(a) | 5 | do | 4 | 220 | 175 |
| 37 | SPSS(6M) (added last) | 1.5 | PEI(a) (added first) | 5 | do | 4 | 220 | 65 |

Footnotes to Table 2; as employed in the present specification:
[1] VBT refers to a homopolymer of vinylbenzyl trimethylammonium chloride. A 0.4 percent by weight solution of this polymer in 2 percent aqueous sodium chloride had a viscosity of 1.32 centipoises Ostwald at 25° C.
[2] SPSS(4M) and SPSS(6M) refer to homopolymers of sodium styrene sulfonate having estimated molecular weights of approximately 4 and 6 million, respectively.
[3] DMAEM refers to a homopolymer of dimethylaminoethyl methacrylate. A 0.5 percent by weight solution of this polymer in 4 percent aqueous sodium chloride exhibited a viscosity of 14.3 centipoises Ostwald at 25° C.
[4] PEI(a) refers to a polyethylenimine having an estimated molecular weight of about 200,000.
[5] PAAm refers to a polyacrylamide characterized by hydrolysis of about 4 percent of its available carboxamide groups to carboxylic groups and by a viscosity of 50 centipoises Ostwald for an aqueous 0.5 percent by weight solution thereof at a pH of 3 and a temperature of 25° C.
[6] PAAm(30) refers to a high molecular weight polyacrylamide characterized in that 30 percent of the available carboxamide groups were hydrolyzed.
[7] SMA means a copolymer of styrene and maleic anhydride having an estimated molecular weight of about 4 million.
[8] SSM is a copolymer of 85 mole percent sodium styrene sulfonate and 15 mole percent methacrylic acid.
[9] VBT-AAm means a copolymer containing about 75 mole percent vinylbenzyl trimethylammonium chloride and about 25 mole percent acrylamide.

EXAMPLE 4

Studies of the rate of filtration for untreated and digested sludge conditioned according to the invention were carried out by following a procedure similar to that set forth in Example 3. In this experiment, however, the volumes of the filtrate produced at the end of several time intervals from the initiation of filtration were recorded. Also, in certain runs, the polymer treated sludge was subjected to severe agitation prior to the filtration step. Improved filtration rates in such instances are indicative of aggregate stability. Agitation designated hereinafter as "gentle" was accomplished by pouring the suspension of agglomerated organic solids from one container to another four times. Severe agitation refers to stirring the suspension in a one liter beaker with a 3 inch wide paddle at 45 r.p.m. for 30 minutes.

Typical filtration rates obtained with the use of combinations of anionic and cationic organic polymers are summarized in the following Table 3. In Runs 1–3 the initial undiluted sludge aliquot was 200 milliliters and in all others the initial undiluted aliquot was 100 milliliters.

Table 3.—Filtration of sewage sludges

| Run | Dose of Anionic Polymer | Lbs./Ton Dry Solids | Dose of Cationic Polymer | Lbs./Ton Dry Solids | Sludge Type | Dry Solids (gms.) | Diluted Sludge (ml.) | Milliliters of Filtrate Collected at Specified Time Intervals | | | Agitation |
|---|---|---|---|---|---|---|---|---|---|---|---|
| | | | | | | | | 10 Sec. | 20 Sec. | 30 Sec. | |
| 1 Control | SPSS(6M) (F.N. 2, Table 2). | 1.0 | | | Activated sludge (biologically oxidized). | 2 | 230 | | | <30 | Gentle. |
| 2 Control | | | PEI(a) (F.N. 4, Table 2). | 6 | ...do... | 2 | 230 | 130 | 190 | 213 | Do. |
| 3 | SPSS(6M) | 1.0 | PEI(a) | 4 | ...do... | 2 | 230 | 140 | 200 | 214 | Do. |
| 4 Control | | | PEI(a) | 4 | Mixture of raw sludge and activated sludge. | 10 | 150 | 50 | 72 | 100 | Do. |
| 5 | SPSS(6M) | .5 | PEI(a) | 2 | ...do... | 10 | 150 | 70 | 98 | 110 | Do. |
| 6 Control | | | Epi-DMA(10) | 4 | Raw sludge | 5 | 160 | 90 | 135 | 143 | Do. |
| 7 | SPSS(6M) | 1.0 | Epi-DMA(10) | 4 | ...do... | 5 | 160 | 125 | 145 | 146 | Do. |
| 8 Control | | | Epi-DMA(10) | 4 | Anaerobically digested sludge. | 10 | 150 | 5 | 10 | 12 | Do. |
| 9 | SPSS(6M) | 1.0 | Epi-DMA(10) | 4 | ...do... | 10 | 150 | 25 | 55 | 70 | Do. |
| 10 Control | | | PEI(a) | 4 | ...do... | 10 | 160 | 90 | 117 | 122 | Do. |
| 11 | SPSS(6M) | 1.0 | PEI(a) | 3 | ...do... | 10 | 160 | 100 | 117 | 121 | Do. |
| 12 Control | | | PEI(a) | 4 | ...do... | 10 | 160 | 50 | 85 | 102 | Severe. |
| 13 | SPSS(6M) | 1.0 | PEI(a) | 3 | ...do... | 10 | 160 | 90 | 120 | 132 | Do. |
| 14 Control | | | Epi-DMA | 6 | ...do... | 10 | 160 | 19 | 30 | 38 | Do. |
| 15 | PAAm(30) | 1.0 | Epi-DMA | 5 | ...do... | 10 | 160 | 50 | 80 | 100 | Do. |
| 16 Control | | | Polyamine X(11) | 4 | ...do... | 10 | 160 | 55 | 80 | 98 | Gentle. |
| 17 | SPSS(6M) | 1.0 | ...do... | 3 | ...do... | 10 | 160 | 90 | 115 | 120 | Do. |
| 18 Control | | | ...do... | 4 | ...do... | 10 | 160 | 20 | 32 | 40 | Severe. |
| 19 | SPSS(6M) | 1.0 | ...do... | 3 | ...do... | 10 | 160 | 62 | 90 | 106 | Do. |
| 20 Control | | | Polyamine Y(12) | 4 | ...do... | 10 | 160 | 20 | 30 | 35 | Gentle. |
| 21 | SPSS(6M) | 1.0 | ...do... | 3 | ...do... | 10 | 160 | 50 | 78 | 94 | Do. |
| 22 Control | | | ...do... | 4 | ...do... | 10 | 160 | 12 | 16 | 20 | Severe. |
| 23 | SPSS(6M) | 1.0 | ...do... | 3 | ...do... | 10 | 160 | 55 | 73 | 103 | Do. |

Footnotes to Table 3; as employed in the present specification:
[10] Epi-DMA means the reaction product of epichlorohydrin and dimethylamine in a 1:1 molar ratio and 13 percent by weight of tetraethylenepentamine.
[11] Polyamine X refers to a commercial cationic amine condensation polymer available as Nalco 600 polyamine.
[12] Polyamine Y refers to commercial catonic amine condensation polymer available as Kymene 66 polyamine.

EXAMPLE 5

The following is illustrative of the application of the invention to the filtration of anaerobically digested sludge on a plant scale basis. Sludge containing approximately 10 percent solids on a dry weight basis was pumped into a 150 gallon chemical conditioning tank at a rate of from 10 to 30 gallons per minute. The tank was equipped with three paddle mixers which operated at 15 r.p.m. on a horizontal axis. The sludge entering at one end of the tank was treated first with 0.5 pound per ton of dry solids of sodium polystyrene sulfonate having a molecular weight of approximately 4.5 million [SPSS(4.5M)]. The polymer was made up in the form of a stock solution containing 1 percent by weight polymer solids and added to the sludge with 6 to 10 gallons of dilution water per minute. Thereafter, as the sludge proceeded through the conditioning tank, it was treated with 3.5 pounds per ton of sludge dry solids of polyvinylbenzyltrimethylammonium chloride (VBT) which was made up in the form of an aqueous solution containing 10 percent by weight of the polymer and likewise added to the sludge with 6 to 10 gallons of dilution water per minute.

From the conditioning tank the sludge overflowed into a sludge pan which, when filled to the proper depth, presented the sludge to rotary vacuum drum filters. The drum filters were 3 feet in diameter and 6 feet long. They were covered with 32 by 32 mesh saran cloth filters. The filters were operated at a reduced pressure of 20 to 25 inches of mercury.

In a separate but similar operation, the sewage sludge was treated with a conventional system of ferric chloride and calcium oxide.

The results of the above operations involving the vacuum filtration of a digested sludge on a plant scale basis are set forth in the following table.

Table 4.—Vacuum filtration of digested sludge plant trial, instantaneous data

| Operation Specifications | (Sludge Treatment) | |
|---|---|---|
| | I FeCl₃/CaO | II VBT/SPSS |
| Chemical dose (lbs./ton dry solids in sludge) | 85/250 | 3.5/0.5 |
| Percent dry solids in sludge | 11.5 | 11.9 |
| Drum speed (min./rev.) | 2.10 | 1.65 |
| Cake moisture (weight percent) | 68.2 | 68.0 |
| Cake thickness (inches) | 1/4 | 1/4 |
| Yield (lbs./sq. ft./hr.) | 9.2 | 18.6 |
| Cake (percent solids dry basis) | 31.8 | 32.0 |
| Filtrate (suspended solids mg./L.) | 2,673 | 760 |

EXAMPLE 6

Further filtration experiments were carried out with another municipal digested sewage sludge containing 5 percent by weight solids on a dry basis. 100 milliliter aliquots of this sludge were diluted to 1,000 milliliters and subsequently settled for 30 minutes to simulate elutriation of the sludge. This was done to remove ammonia alkalinity from the sludge. The solids, which settled to a volume of approximately 150 to 180 milliliters, were subsequently filtered after addition of sufficient dilution water made up a total volume of 200 milliliters. Separate aliquots of the sludge were treated at various stages during the elutriation and filtration operations with various anionic polymers employed sequentially with a cationic polymer. Two of the anionic polymers used (SPSS(6M)

and PAAm(30)) and the cationic polymer (PEI$_{(a)}$) are described in the footnotes to Table 2. A third anionic polymer used was a high molecular weight sulfonated polyvinyltoluene (SPVT).

The dewatering rates of the underflow solids (settled solids) were determined at several time intervals after initiation of the filtration operation. Filtration was accomplished in a Buchner funnel substantially according to the procedure employed in Example 4.

The results of these experiments are reported in the following Table 5 wherein the polymer doses and stage at which the polymer was introduced into the sludge are indicated along with the observed filtrate volumes in milliliters at specified time intervals.

The results shown in Runs 2, 4, 7, 9 and 11 as compared respectively to Runs 1, 3, 5, 8 and 10 illustrate the importance of adding the cationic polymer to the sludge just prior to filtration. A comparison of Runs 5 and 6 indicates good results are obtained regardless of when the anionic polymer is introduced in the system to be filtered.

Based on the foregoing experiments a plant trial was carried out wherein the SPSS(6M) polymer was incorporated into the sludge in an elutriation step followed by treatment of the elutriated and settled solids (underflow solids) with the PEI$_{(a)}$ polymer just prior to filtration. For purposes of comparison, additional runs were made on elutriated sludge conditioned for filtration by treatment of the sludge with (1) ferric chloride and lime and (2) with PEI$_{(a)}$ polymer alone. The results obtained are set forth below along with the conditions under which the filtration operations were conducted.

mer treating solutions and/or additional water to make up a total volume of 1,000 milliliters with the simultaneous achievement of predetermined polymer dosage. Anionic polymers employed were a high molecular weight sodium polystyrene sulfonate (SPSS(6M)) and a high molecular weight partially hydrolyzed polyacryl amide (PAAm(30)). The cationic polymers were polyethylenimine (PEI$_{(a)}$) and vinylbenzyl trimethylammonium chloride (VBT). These polymers were constituted substantially as described for the corresponding symbols in the footnotes to Table 2.

When the treatment consisted of one polymer, the sludge was stirred gently after dilution with the polymer solution for five minutes. Dual polymer treatments were accomplished by gentle stirring for three minutes after the addition of each of the polymer solutions.

Table 5

| Run No. | Polymer Treatment | | | | Volume of Filtrate Collected at Specified Time Interval | | | |
|---|---|---|---|---|---|---|---|---|
| | During Elutriation | | Just Prior to Filtration | | 10 Sec. | 20 Sec. | 30 Sec. | 60 Sec. |
| | Anionic | Cationic | Anionic | Cationic | | | | |
| 1 | | | | 8 lbs. PEI$_{(a)}$ | 110 | 160 | 176 | 182 |
| 2 | | 8 lbs. PEI$_{(a)}$ | | | 50 | 65 | 78 | ---- |
| 3 | 1 lb. SPSS(6M) | | | 4 lbs. PEI$_{(a)}$ | 80 | 115 | 130 | 140 |
| 4 | | 4 lbs. PEI$_{(a)}$ | 1 lb. SPSS(6M) | | 30 | 46 | 65 | 90 |
| 5 | 2 lbs. SPSS(6M) | | | 4 lbs. PEI$_{(a)}$ | 120 | 160 | 180 | 190 |
| 6 | | | 2 lbs. SPSS(6M) | 4 lbs. PEI$_{(a)}$ | 125 | 165 | 176 | 188 |
| 7 | 2 lbs. SPSS(6M) | 4 lbs. PEI$_{(a)}$ | | | 40 | 60 | 68 | 94 |
| 8 | 2 lbs. SPVT | | | 4 lbs. PEI$_{(a)}$ | 110 | 160 | 180 | 190 |
| 9 | 2 lbs. SPVT | 4 lbs. PEI$_{(a)}$ | | | 40 | 60 | 68 | 94 |
| 10 | 2 lbs. PAAm(30) | | | 4 lbs. PEI$_{(a)}$ | 75 | 100 | 120 | 160 |
| 11 | 2 lbs. PAAm(30) | 4 lbs. PEI$_{(a)}$ | | | 40 | 50 | 56 | 72 |

Table 7

| Run | Polymer Added (lbs./ton of solids dry basis) | | | | Settling, In./Min. |
|---|---|---|---|---|---|
| | SPSS | PAAm(30) | PEI$_{(a)}$ | VBT | |
| 1 (control) | | | | | None |
| 2 | 1 | | | | None |
| 3 | | | 3.2 | | 4.7 |
| 4 | 1 | | 3.2 | | 7.2 |
| 5 | | 2 | | | None |
| 6 | | 2 | 3.2 | | 9.6 |
| 7 | | | | 5 | 4.6 |
| 8 | 1 | | | 5 | 9.9 |
| 9 | | 2 | | 5 | 11.4 |

Table 6.—Plant trial

| Elutriation | Run A | Run B | Run C |
|---|---|---|---|
| Chemical treatment | SPSS (6M) | None | None. |
| Dose, lbs./ton of solids, dry basis | 1.5 | | |
| Sludge solids, wt. percent | 5.1 | 5.4 | 5.4 |
| Vol. wash water/vol. sludge | 8/1 | 8/1 | 8/1. |
| Overflow solids, wt. percent | 0.033% | 0.6% | 0.6%. |
| Underflow solids, wt. percent | 10% | 8% | 8%. |
| Filtration of Under Underflow Solids: | | | |
| Chemical treatment [1] | PEI$_{(a)}$ | PEI$_{(a)}$ | FeCl$_3$/CaO. |
| Dose, lbs./ton of solids, dry basis | 5 | 8 | 60/250. |
| Sludge flow, gal./min | 40 | 27 | 27. |
| Dilution water flow, gal./min | 10 | 20 | 2. |
| Filter cake yield, lbs./ft.$^2$/hr | 17 | 7 | 4. |

[1] These chemicals were added to the sludge stream with gentle agitation just upstream from the filter.

EXAMPLE 7

The experiments described below demonstrate the applicability of the conditioning process of the invention to a thickening process for non-free settling suspensions of agglomerated organic solids. The suspension thickened in these experiments was a digested municipal sludge ultimately diluted to about 0.5 percent by weight solids on a dry basis. 900 milliliter aliquots of the sludge, in an as received condition, were mixed with sufficient polymer treating solutions and/or additional water to make up a total volume of 1,000 milliliters with the simultaneous achievement of predetermined polymer dosage.

The apparent thickening of the suspended solids, as evidence by their subsidence in a 1,000 milliliter graduate, was observed over a period of about 5 minutes. With this data, average thickening rates in inches per minute were computed. The results of these experiments are set forth in the above table.

What is claimed is:

1. In a process for dewatering a liquid, aqueous suspension of predominately organic, hydrophilic solids not susceptible of conditioning for dewatering with an anionic organic polymer as the sole treating agent, which solids are in an agglomerated condition and at a concentration whereby the solids are essentially non-free settling, which process comprises adding to the suspension with mixing a water-soluble, cationic, nitrogenous organic polymer, said polymer being employed in an amount sufficient to promote dewatering of the suspension; the improvement which consists in adding to the suspension prior to the addition of the nitrogenous organic polymer, and with intervening mixing, a water-soluble, high molecular weight, anionic organic polymer characterized by a molecular weight of at least 0.5 million and as having a polyalkane backbone with a plurality of ionic substituent groups selected from the group consisting of carboxylic and sulfonic acid groups and alkali metal salts of the acid groups; the total water of dilution added with the polymers being maintained within the range from about 0.01(S) to about 1.0(S) volumes of water per volume of liquid aqueous suspension, wherein S equals the parts of solids, on a dry basis, per 100 parts of aqueous suspension and said anionic organic polymer being added to the aqueous suspension in a small amount, relative to the amount of nitrogenous organic polymer used, such amount of anionic polymer being effective to enhance the dewatering rate of the treated aqueous suspension.

2. In a process for dewatering a liquid, aqueous suspension of predominantly organic, hydrophilic solids, which solids not susceptible of conditioning for dewatering with an anionic organic polymer as the sole treating agent are in an agglomerated condition and at a concentration whereby the solids are essentially non-free settling, which process comprises adding to the suspension with mixing a dilute aqueous solution of a water-soluble, cationic, nitrogeneous organic polymer, said polymer being employed in an amount sufficient to promote dewatering of the suspension; the improvement which consists in adding to the suspension prior to the addition of the nitrogenous organic polymer, and with intervening mixing, a dilute aqueous solution of a water-soluble, high molecular weight, anionic organic polymer characterized by a molecular weight of at least 0.5 million and as having a polyalkane backbone with a plurality of ionic substituent groups selected from the group consisting of carboxylic and sulfonic acid groups and alkali metal salts of the acid groups; the total water or dilution added with the polymers being maintained within the range from about 0.01(S) to about 1.0(S) volumes of water per volume of liquid aqueous suspension, wherein S equals the parts of solids, on a dry basis, per 100 parts of aqueous suspension and said anionic organic polymers being added to the aqueous suspension in a small amount, relative to the amount of nitrogenous organic polymer used, such amount of anionic polymer being effective to enhance the dewatering rate of the treated aqueous suspension.

3. A method as in claim 2 wherein the anionic organic polymer is incorporated into the aqueous suspension during clarification of a waste stream to produce said suspension as a solids underflow.

4. In a process for dewatering a sewage sludge not susceptible of conditioning for dewatering with an anionic organic polymer as the sole treating agent which comprises adding to the sludge, with mixing a dilute aqueous solution of a water-soluble, cationic, nitrogenous organic polymer, said polymer being employed in an amount sufficient to promote dewatering of the sludge; the improvement which consists in adding to the sludge prior to the addition of the nitrogenous organic polymer, and with intervening mixing, a dilute aqueous solution of a water-soluble, high molecular weight, anionic organic polymer characterized by a molecular weight of at least 0.5 million and as having a polyalkane backbone with a plurality of ionic substituent groups selected from the group consisting of carboxylic and sulfonic acid groups and alkali metal salts of the acid groups; the total water of dilution added with the polymers being maintained within the range from about 0.01(S) to about 1.0(S) volumes of water per volume of sewage sludge, wherein S equals the parts of solids, on a dry basis, per 100 parts of sewage sludge and said anionic organic polymer being added to the sludge in a small amount, relative to the amount of nitrogenous organic polymer used, such amount being effective to enhance the dewatering rate of the treated sludge.

5. A method as in claim 4 wherein the anionic organic polymer employed is a high molecular weight, alkali metal polystyrene sulfonate.

6. A method as in claim 4 wherein the anionic organic polymer employed is partially hydrolyzed polyacrylamide having at least 4 percent of its carboxamide moities hydrolyzed to alkali metal carboxylate groups.

7. In a process for dewatering a sewage sludge not susceptible of conditioning for dewatering with an anionic organic polymer as the sole treating agent comprising adding to the sludge, with mixing, a dilute aqueous solution of a water-soluble, cationic, nitrogenous organic polymer represented by the formula:

wherein R is selected from the group consisting of hydrogen and methyl and $n$ is at least 400, inclusive, of hydrochloric, sulfuric, phosphoric, carbonic, and acetic acid salts of the foregoing polymers, said polymer being employed in an amount sufficient to promote dewatering of the sludge; the improvement which consists in adding to the sludge prior to the addition of the nitrogenous organic polymer, and with intervening mixing sufficient to uniformly distribute the polymer throughout the sludge, a dilute aqueous solution of a water-soluble, high molecular weight, anionic organic polymer characterized by a molecular weight of at least 0.5 million and as having a polyalkane backbone with a plurality of ionic substituent groups selected from the group consisting of carboxylic and sulfonic acid groups and alkali metal salts of the acid groups; the total water of dilution added with the polymers being maintained within the range from about 0.01(S) to about 1.0(S) volumes of water per volume of sewage sludge, wherein S equals the parts of solids, on a dry basis, per 100 parts of sewage sludge and said anionic organic polymer being added to the sludge in a small amount, relative to the amount of nitrogenous organic polymer used, such amount being effective to enhance the dewatering rate of the treated sludge.

8. In a process for dewatering a liquid, aqueous suspension of predominately organic, hydrophilic solids not susceptible of conditioning for dewatering with an anionic organic polymer as the sole treating agent, which solids are in an agglomerated condition and at a concentration whereby the solids are essentially non-free settling, which process comprises adding to the suspension, with mixing, a dilute aqueous solution of a water-soluble, cationic, nitrogenous organic polymer having a plurality of nitrogenous groups selected from the group consisting of amino, imino and quaternary nitrogen groups, said polymers being employed in an amount sufficient to promote dewatering of the sludge, and thereafter separating the suspension into solid and liquid phases by filtration; the improvement which consists in adding to the suspension prior to the addition of the nitrogenous organic polymer, and with intervening mixing sufficient to uniformly distribute the polymer throughout the suspension, a dilute aqueous solution of a water-soluble, high molecular weight, anionic organic polymer characterized by a molecular weight of at least 0.5 million and as having a polyalkane backbone with a plurality of ionic substituent groups selected from the group consisting of carboxylic and sulfonic acid groups and alkali metal salts of the acid groups; the total amount of the anionic polymer employed being within the range from about 0.01 to about 2.5 pounds per ton of organic solids on a dry basis and the total water of dilution added with the polymers being maintained within the range from about 0.01(S) to about 1.0(S) volumes of water per volume of aqueous suspension, wherein S equals the parts of solids, on a dry basis, per 100 parts of aqueous suspension, said anionic organic polymer being added to the suspension in a small amount, relative to the amount of nitrogenous organic polymer used, such amount of anionic polymer being effective to enhance the dewatering rate of the suspension.

9. In a process for dewatering a liquid, aqueous suspension of predominantly organic, hydrophilic solids not susceptible of conditioning for dewatering with an anionic organic polymer as the sole treating agent, whiih solids are in an agglomerated condition and at a concentration whereby the solids are essentially non-free settling, which process comprises adding to the suspension, with mixing, a dilute aqueous solution of a water-soluble, cationic, nitrogenous organic polymer having a plurality of nitrogenous groups selected from the group consisting of amino, imino and quaternary nitrogen groups, said polymer being employed in an amount sufficient to promote dewatering of the sludge, and thereafter separating the suspension into solid and liquid phases by introducing the polymer treated suspension into a quiescent zone for a detention period of at least 30 minutes whereby the solids are thickened by the technique of compaction; the improvement which consists in adding to the suspension prior to the addition of the nitrogenous organic polymer, and with intervening mixing sufficient to uniformly distribute the polymer throughout the suspension, a dilute aqueous solution of water-soluble, high molecular weight, anionic organic polymer characterized by a molecular weight of at least 0.5 million and as having a polyalkane backbone with a plurality of ionic substituent groups selected from the group consisting of carboxylic and sulfonic acid groups and alkali metal salts of the acid groups, the total amount of the anionic polymer employed being within the range from about 0.5 to about 10 pounds per ton of organic solids on a dry basis, and the total water of dilution added with the polymers being maintained within the range from about 0.01(S) to about 1.0(S) volumes of water per volume of aqueous suspension, wherein S equals the parts of solids, on a dry gasis, per 100 parts of aqueous suspension, said anionic organic polymer being added to the suspension in a small amount, relative to the amount of nitrogenous organic polymer used, said amount of anionic polymer being sufficient to enhance the dewatering rate of the suspension.

References Cited by the Examiner

UNITED STATES PATENTS 3,142,638   7/1964   Blaisdell et al. _________ 210—52

FOREIGN PATENTS 826,770   1/1960   Great Britain.

MORRIS O. WOLK, *Primary Examiner.*

M. E. ROGERS, *Assistant Examiner.*